(12) United States Patent
Nozawa et al.

(10) Patent No.: US 8,964,042 B2
(45) Date of Patent: Feb. 24, 2015

(54) IMAGING DEVICE FOR RADIATING INTERNAL HEAT

(71) Applicant: JVC KENWOOD Corporation, Yokohama-shi (JP)

(72) Inventors: Masayuki Nozawa, Yokohama (JP); Munenobu Nakayama, Yokohama (JP); Yoichi Nakano, Yokohama (JP); Taguchi Hiromi, Yokohama (JP)

(73) Assignee: JVC KENWOOD Corporation (JP)

( * ) Notice: Subject to any disclaimer, the term of this patent is extended or adjusted under 35 U.S.C. 154(b) by 0 days.

(21) Appl. No.: 14/049,642

(22) Filed: Oct. 9, 2013

(65) Prior Publication Data

US 2014/0184835 A1 Jul. 3, 2014

(30) Foreign Application Priority Data

Dec. 28, 2012 (JP) ................................. 2012-287284

(51) Int. Cl.
*H04N 5/228* (2006.01)
*H04N 5/225* (2006.01)
*G03B 17/00* (2006.01)
*H04N 5/232* (2006.01)

(52) U.S. Cl.
CPC ................................. *H04N 5/23261* (2013.01)
USPC ........ 348/208.3; 348/373; 348/374; 396/419; 396/427

(58) Field of Classification Search
CPC ....... H04N 1/00978; H04N 1/00981–1/00989; H04N 2201/03158; H05K 7/20; H05K 7/202; H05K 7/20218; H05K 7/20154; H05K 7/20163; H05K 7/20172

USPC ........... 348/143–160, 244, 207.99, 373–376, 348/208.3; 396/12, 29, 571, 439, 539–540, 396/626, 419–428; 248/274.4, 276.1, 248/299.1, 283.1, 179.1, 189.1, 127, 660, 248/184.1, 41, 57; 454/184; 361/679.46–697, 714–719, 724–727; 165/80.2–80.3, 104.33, 121–126, 185; 257/678, 687, 701, 712–713, 717–720
See application file for complete search history.

(56) References Cited

U.S. PATENT DOCUMENTS

| | | | | |
|---|---|---|---|---|
| 3,715,491 | A * | 2/1973 | Finch | 348/243 |
| 6,061,087 | A * | 5/2000 | Schieltz et al. | 348/151 |
| 6,072,697 | A * | 6/2000 | Garcia-Ortiz | 361/704 |
| 8,511,915 | B2 * | 8/2013 | Lee | 396/427 |
| 2004/0195676 | A1 * | 10/2004 | Quarre | 257/713 |

(Continued)

FOREIGN PATENT DOCUMENTS

JP 2012169875 9/2012

*Primary Examiner* — Pritham Prabhakher
(74) *Attorney, Agent, or Firm* — Cantor Colburn LLP (57) ABSTRACT

A first heat radiation unit is formed on one surface of the imaging unit in a vertical direction. A second heat radiation unit is formed on the other surface of the imaging unit in the vertical direction. A third heat radiation unit is formed on a surface opposite to an imaging direction of the imaging unit. A first heat transfer unit transfers heat of a first heat source of the imaging unit to the first heat radiation unit and the third heat radiation unit. A second heat transfer unit transfers heat of a second heat source of the imaging unit, which has a higher maximum allowable temperature than the first heating unit, to the second heat radiation unit. A heat insulation unit suppresses heat transfer between the first and the second heat radiation units and between the third and the second heat radiation units.

2 Claims, 10 Drawing Sheets

(56) References Cited

U.S. PATENT DOCUMENTS

| | | | |
|---|---|---|---|
| 2005/0276599 A1* | 12/2005 | Kajino et al. | 396/419 |
| 2007/0024743 A1* | 2/2007 | Hida | 348/373 |
| 2007/0183772 A1* | 8/2007 | Baldwin et al. | 396/439 |
| 2009/0244363 A1* | 10/2009 | Sugimura et al. | 348/374 |
| 2012/0177357 A1* | 7/2012 | Lee | 396/427 |
| 2013/0128105 A1* | 5/2013 | Nunnink | 348/374 |

* cited by examiner

IMAGING DEVICE FOR RADIATING INTERNAL HEAT

CROSS-REFERENCE TO RELATED PATENT APPLICATIONS

This application claims the benefit of Japanese Patent Application No. 2012-287284, filed on Dec. 28, 2012, in the Japan Patent Office, the disclosure of which is incorporated herein in its entirety by reference.

BACKGROUND OF THE INVENTION

1. Field of the Invention

The present invention relates to an imaging device, and more particularly, an imaging device including a heat radiation unit that radiates internal heat.

2. Description of the Related Art

Imaging devices are known to include a heat radiation unit in order to prevent an increase in temperature due to heat generation of a circuit or a component within the imaging device (for example, refer to Patent Document 1).

A video camera disclosed in Patent Document 1 transfers heat from a substrate 5 and a substrate 6, which are heating units of the video camera, to right and left side panels of a case, and performs heat radiation from the right and left side panels.

Here, examples of a primary heating unit of the video camera may include an image processing unit such as an application specific integrated circuit (ASIC) or a digital signal processor (DSP) that processes a signal, and an imaging element such as a charge coupled device (CCD) image sensor or a complementary metal oxide semiconductor (CMOS) image sensor. In general, the image processing unit generates a large amount of heat. The imaging element does not generate a large amount of heat, but a maximum allowable temperature which can function as the element is low. Therefore, the performance or lifespan of the imaging element may deteriorate due to an excessive increase in temperature.

However, the video camera disclosed in Patent Document 1 uses the right and left side panels that are symmetrical to each other, and does not change the size or arrangement of the side panels in accordance with the features of the heating units. That is, the video camera does not consider such features of the heating unit with regard to cooling. Therefore, there is a problem in that it is difficult to appropriately perform heat radiation according to the features of the heating units.

(Patent Document 1) Japanese Laid-Open Patent Publication No. 2012-169875

SUMMARY OF THE INVENTION

The present invention provides a technique capable of appropriately performing heat radiation according to features of heating units of an imaging device.

In order to solve the above-mentioned problem, the present invention provides the following device.

An imaging device including an imaging unit 10 that includes a first heat source 104 and a second heat source 102 having a higher maximum allowable temperature than the first heat source and performs imaging, a transparent cover 70 that covers the imaging unit, a tilting driving unit 40 that drives the imaging unit in a tilting direction, a panning driving unit 50 that drives the imaging unit in a panning direction, a first heat radiation unit 302 that is formed on one surface of the imaging unit in a direction, which is perpendicular to an imaging direction and a rotation axis of the tilting driving unit, and whose an exposed portion has a contour of a substantially spherical surface shape about an intersection point between the rotation axis of the tilting driving unit and a rotation axis of the panning driving unit, a second heat radiation unit 301 that is formed on the other surface of the imaging unit in a direction, which is perpendicular to the imaging direction and the rotation axis of the tilting driving unit, and whose an exposed portion has a contour of a substantially spherical surface shape about the intersection point between the rotation axis of the tilting driving unit and the rotation axis of the panning driving unit, a third heat radiation unit 303 that is formed on a rear surface of the imaging unit when the imaging direction is set to a front, and whose an exposed portion has a contour of a substantially spherical surface shape about the intersection point between the rotation axis of the tilting driving unit and the rotation axis of the panning driving unit, a first heat transfer unit 110 that transfers heat of the first heat source to the first heat radiation unit and the third heat radiation unit, a second heat transfer unit 108 that transfers heat of the second heat source to the second heat radiation unit, and a heat insulation unit 112 that suppresses heat transfer between the first and the second heat radiation units and between the third and the second heat radiation units.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a domed camera, which is an embodiment of an imaging device of the present invention, will be described in detail with reference to the accompanying drawings. However, components, types, combinations, shapes, relative arrangement of the components, and the like are not meant to limit a scope of the invention thereto but are simple examples of explanation unless specifically described otherwise. In addition, the same portions and matters are denoted by the same reference numerals and signs, and repeated descriptions thereof will be omitted.

<Configuration>

Figure 1:
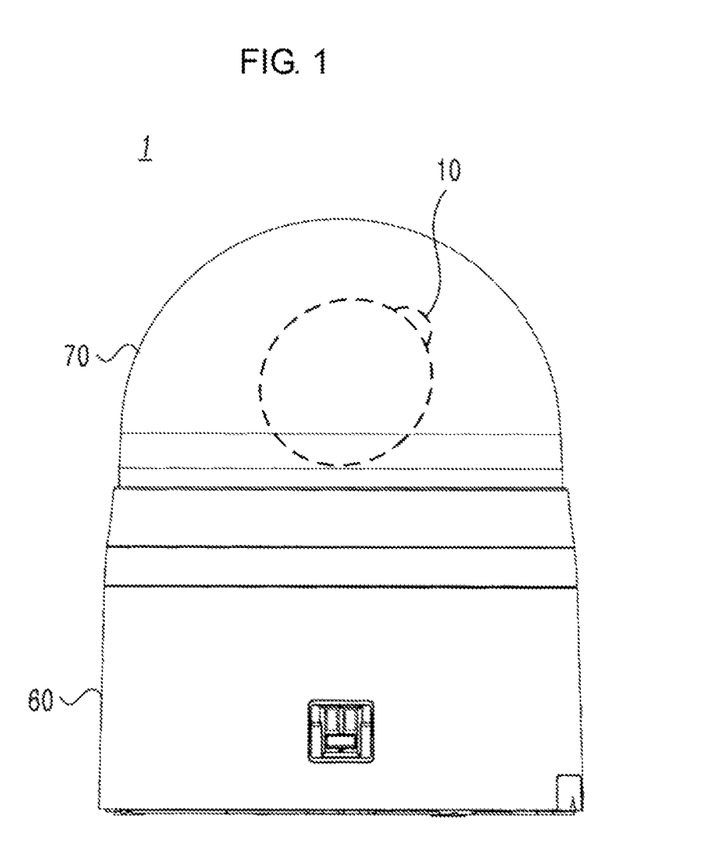
FIG. 1 is a diagram illustrating an appearance of a domed camera which is an embodiment of an imaging device of the present invention.
Figure 2:
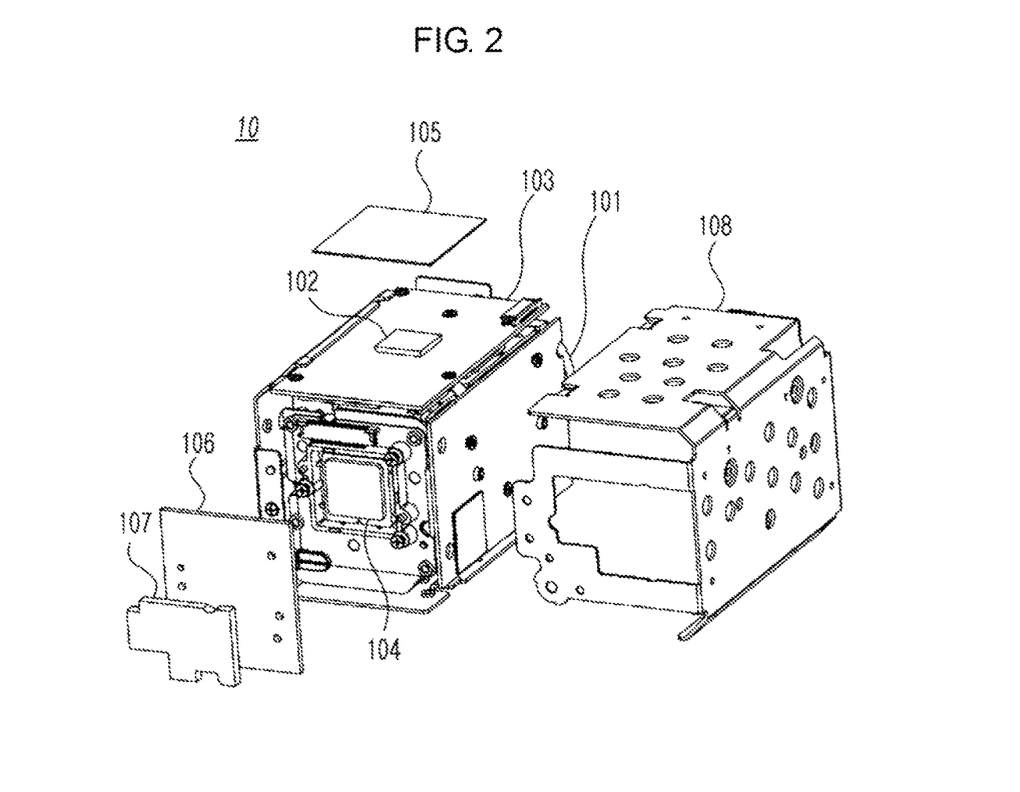
FIG. 2 is a configuration diagram of a camera module that is used in the domed camera.

As illustrated in FIG. 1, a domed camera 1 of the present embodiment includes a case portion 60, a domed cover 70 that is transparent or translucent, and a camera module 10 that is provided within the domed cover 70. When the domed camera 1 is actually attached to a ceiling, the domed camera in a state illustrated in FIG. 1 is turned upside down and is then attached to the ceiling. However, for convenience of description, the domed camera in a direction illustrated in FIG. 1 will be described. As illustrated in FIG. 2, the camera module 10 includes a lens 101 that acquires an optical image, a CMOS image sensor 104 that generates an image signal by performing photoelectric conversion of the optical image that is acquired by the lens 101, a DSP 102 that performs image processing on the image signal that is generated by the CMOS image sensor 104, a DSP substrate 103 on which the DSP 102 is mounted, a heat transfer member 105 that transfers heat of the DSP 102, a CMOS substrate 106 on which the CMOS image sensor 104 is mounted, a heat transfer member 107 that transfers heat of the CMOS substrate 106, and a cover 108 that protects the camera module 10. Since one surface of the heat transfer member 105 comes into contact with the DSP 102 and the other surface thereof comes into contact with the cover 108, the heat of the DSP 102 is transferred to the cover 108 through the heat transfer member 105.

Since one surface of the heat transfer member 107 comes into contact with the CMOS substrate 106 and the other surface thereof comes into contact with a rear plate 110 to be described below, the heat of the CMOS image sensor 104 is transferred to the rear plate 110 through the CMOS substrate 106 and the heat transfer member 107.

Figure 3:
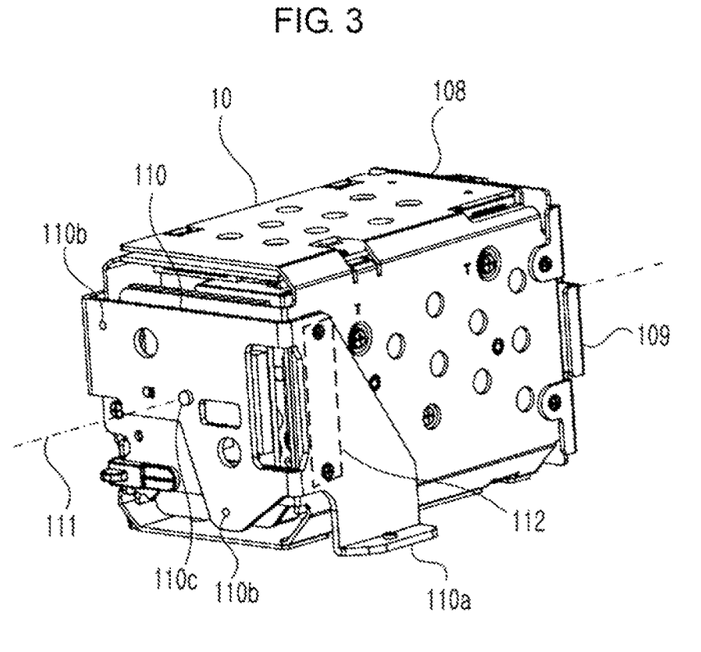
FIG. 3 is a perspective view illustrating configurations of the camera module, a front plate, and a rear plate.

When an imaging direction, that is, a direction including the lens 101, is set as a front direction of the camera module 10, a front plate 109 is attached to the front of the cover 108 as illustrated in FIG. 3. In addition, the rear plate 110 is attached to two right and left positions of the rear of the cover 108, with an insulation sheet 112 interposed therebetween, wherein the insulation sheet is formed of a resin material such as polyethylene terephthalate (PET) and has low heat conductivity. Heat transfer between the rear plate 110 and the cover 108 is suppressed by the insulation sheet 112. The rear plate 110 includes two protrusion portions 110a, which protrude in the downward direction of the camera module in FIG. 3, at right and left positions thereof. Two screw holes 110b are formed on a rear surface of the rear plate 110. In addition, a concave portion 110c having a circular shape about the optical axis 111 is formed in the rear plate 110.

Figure 4A:
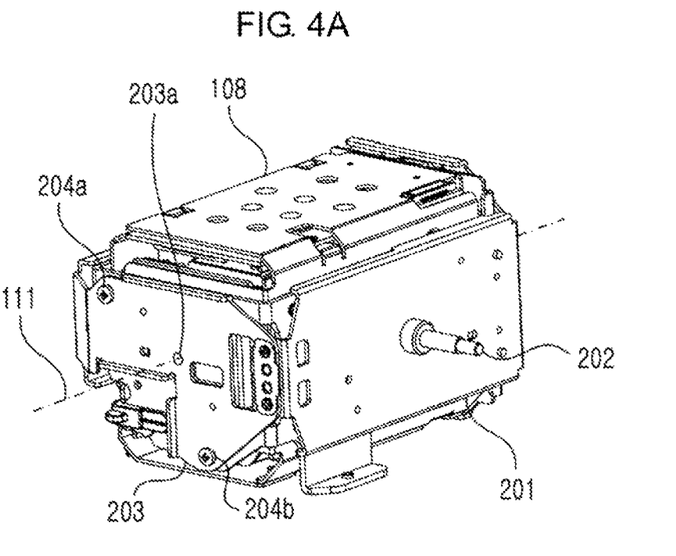
FIGS. 4A and 4B are perspective views illustrating configurations of the camera module, a front bracket, and a rear bracket.
Figure 4B:
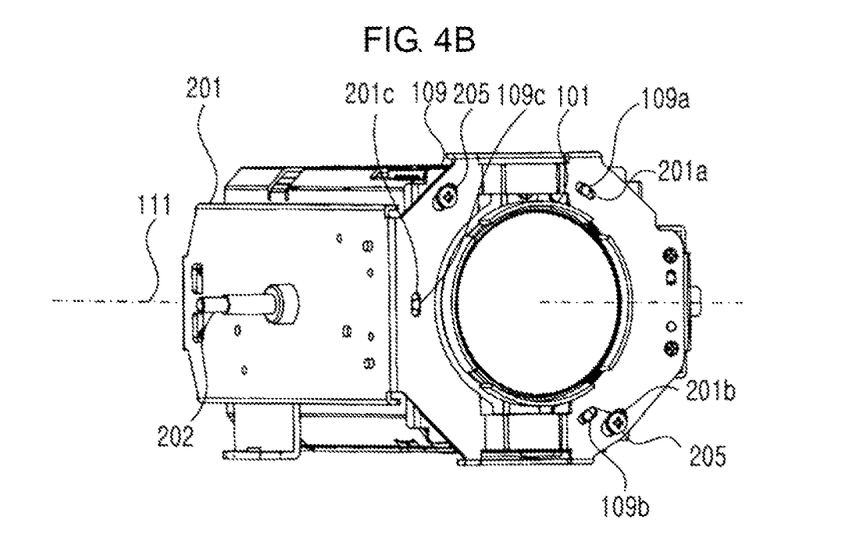

FIG. 4A is a perspective view of the camera module 10 that is obliquely seen from the rear of the camera module 10. FIG. 4B is a perspective view of the camera module 10 that is obliquely seen from the front of the camera module 10. Both FIGS. 4A and 4B show a state where the front plate 109, the rear plate 110, a front bracket 201, and a rear bracket 203 are attached to the camera module 10.

Concave portions 109a, 109b, and 109c having a circular shape are formed on the circumference of the same circle about the optical axis 111 on a front surface of the front plate 109. The L-shaped front bracket 201 is attached to the camera module so as to cover a front surface and a right side surface of the camera module 10. Arc-like elongate holes 201a, 201b, and 201c are formed in the front bracket 201 about the optical axis 111 so as to correspond to the concave portions 109a, 109b, and 109c. The elongate holes 201a, 201b, and 201c are coupled to the concave portions 109a, 109b, and 109c. Thus, the front bracket 201 is configured to be rotatable about the optical axis 111. A tilting rotation axis 202 is also formed in the front bracket 201. The tilting rotation axis 202 is an axis for rotating the camera module 10 in a tilting direction. In addition, the front bracket 201 and the front plate 109 are coupled to each other by using a screw 205 having step flange so as not to be disengaged from each other.

In addition, as illustrated in FIG. 4A, the L-shaped rear bracket 203 is attached to the camera module so as to cover a rear surface and a left side surface of the camera module 10. A circular hole 203a coupled to the concave portion 110c of the rear plate 110 is formed in the rear bracket 203. In addition, although not shown in the drawing, two arc-like elongate holes are formed in the rear bracket 203 about the optical axis 111 so as to correspond to the screw hole 110b that is formed in the rear plate 110. Then, screws 204a and 204b are coupled to the screw hole 110b through the two elongate holes, thereby fixing the rear bracket 203. Since the concave portion 110c and the circular hole 203a are coupled to each other, the rear bracket 203 is configured to be rotatable about the optical axis 111 when the screws 204a and 204b are loosened. In addition, a tilting driving motor 401 to be described below is attached to a portion which is on the reverse side of the rear bracket 203 in FIGS. 4A and 4B. Both the front bracket 201 and the rear bracket 203 are an L-shaped bracket as described above, and together constitute a quadrangular shape in which the front bracket and the rear bracket cover the camera module 10 by fixed to each other via screws at two positions.

Figure 5:
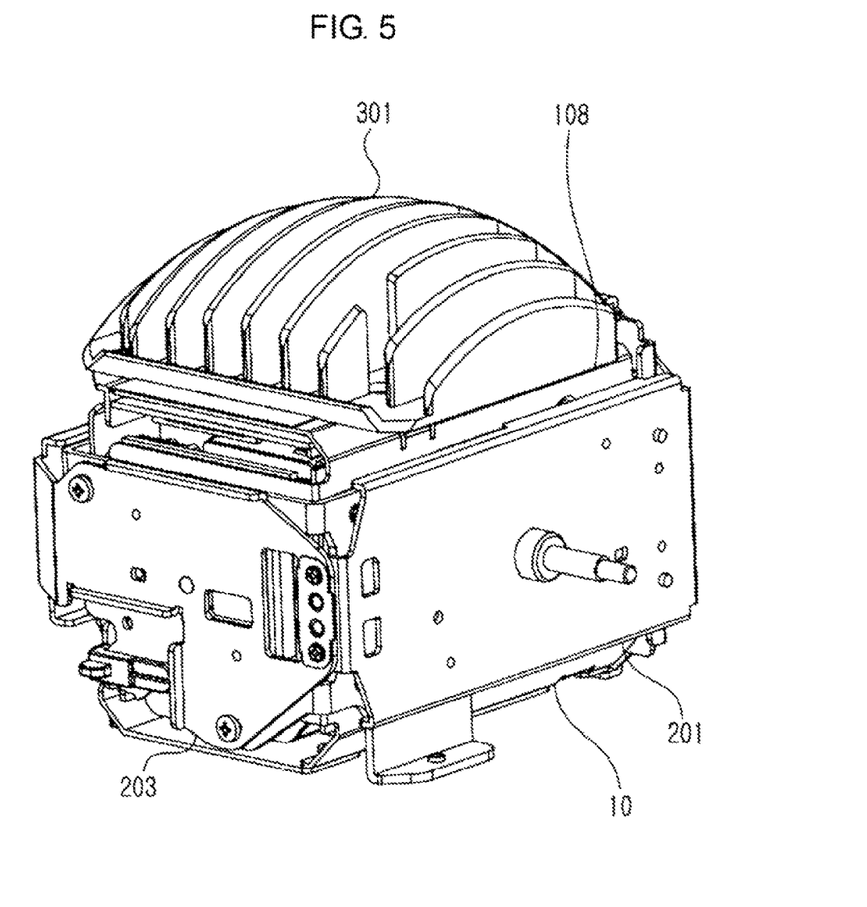
FIG. 5 is a perspective view illustrating configurations of the camera module and an upper heat sink.
Figure 6:
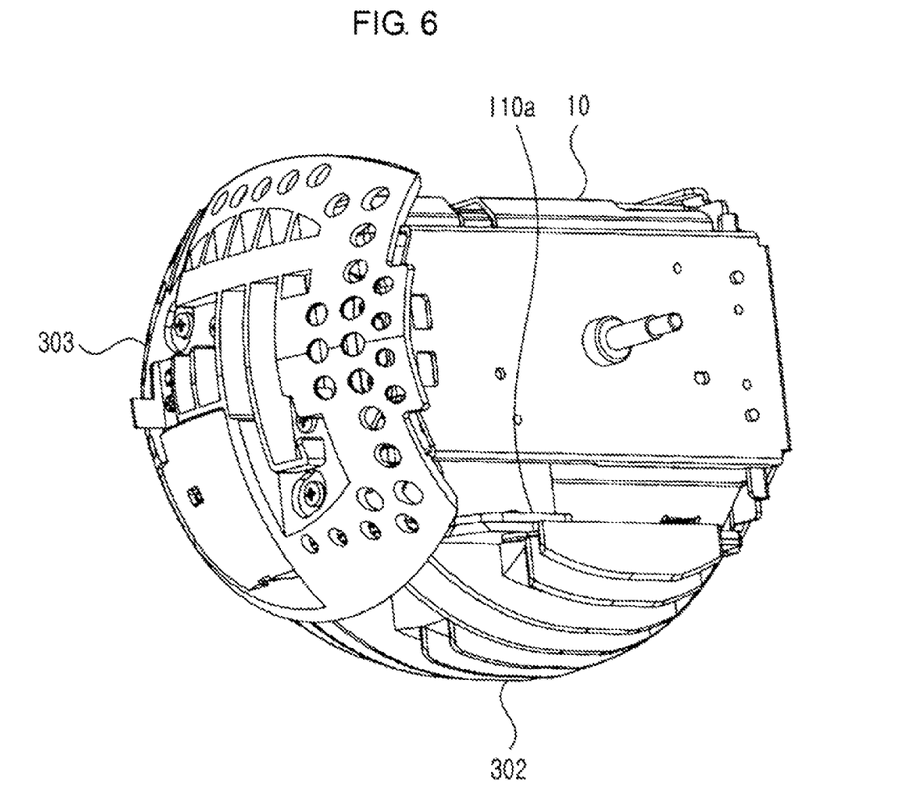
FIG. 6 is a perspective view illustrating configurations of the camera module, a lower heat sink, and a rear heat sink.

When an upper direction in FIG. 5 is set as an upper direction of the camera module, an upper heat sink 301 is fixed to a top portion of the cover 108 by using a screw (not shown) as illustrated in FIG. 5. As illustrated in FIG. 6, a lower heat sink 302 is fixed to the two protrusion portions 110a of the rear plate 110, which protrude from a lower surface of the camera module 10, by using screws. An insulation sheet, which is not shown in the drawing, is interposed between the lower heat sink 302 and the camera module 10, and the lower heat sink 302 is fixed to the camera module 10 by using a screw. A rear heat sink 303 is fixed to the rear bracket 203 provided on a rear surface of the camera module 10 by using a screw. Gaps are formed between the rear heat sink 303, the upper heat sink 301, and the lower heat sink 302 so as not to allow heat transfer therebetween.

An appearance of each of the upper heat sink 301, the lower heat sink 302, and the rear heat sink 303 is configured to have an approximately spherical shape about a rotation center of panning and tilting of the camera module 10 which will be described below.

As described above, the heat of the DSP 102 of the camera module 10 is transferred to the top surface of the cover 108 through the heat transfer member 105, and the heat of the CMOS image sensor 104 is transferred to the rear bracket 203, which is fixed to the rear plate 110, through the CMOS substrate 106, the heat transfer member 107, and the rear plate 110.

Figure 7:
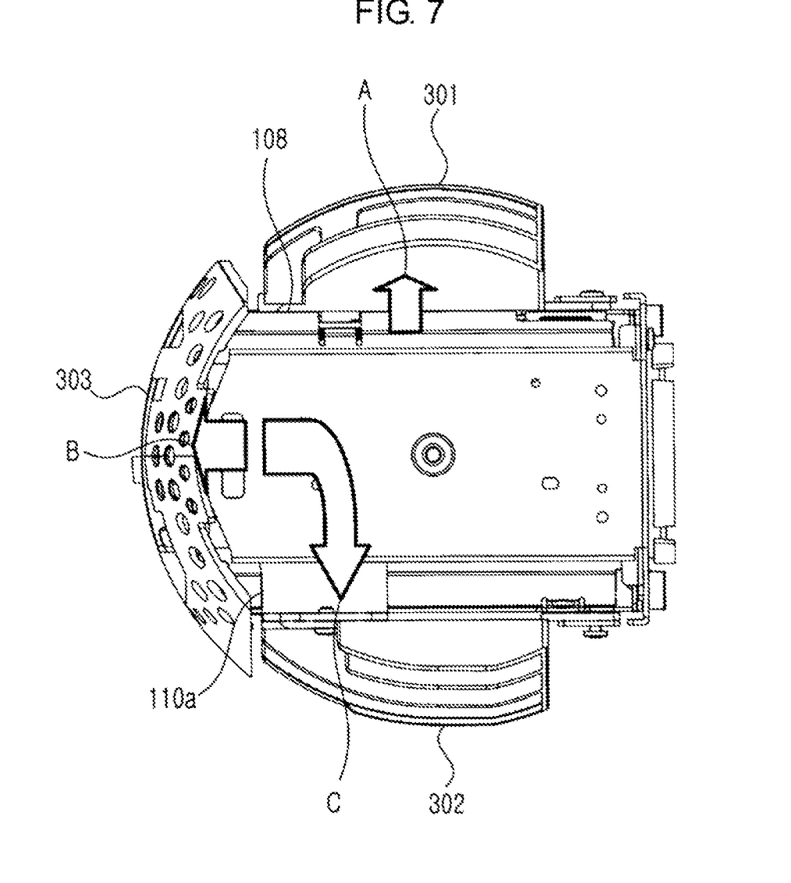
FIG. 7 is a side view illustrating a flow of heat radiation of the camera module.

Therefore, as illustrated in a side view of FIG. 7, the heat of the DSP 102 is transferred to the upper heat sink 301 through the cover 108 above the camera module 10 as indicated by an arrow A, and is then radiated to the outside. The heat of the CMOS image sensor 104 is transferred to the rear heat sink 303 from the rear bracket 203 behind the camera module 10 as indicated by an arrow B, and is then radiated to the outside and is also transferred to the lower heat sink 302 from the protrusion portion 110a of the rear plate 110 below the camera module 10 as indicated by an arrow C, and is then radiated to the outside from the lower heat sink 302.

Since heat transfer between the cover 108 and the rear plate 110 is suppressed by the insulation sheet 112, heat transfer between the upper heat sink 301 and the lower heat sink 302 and between the upper heat sink 301 and the rear heat sinks 303 is suppressed.

Figure 8:
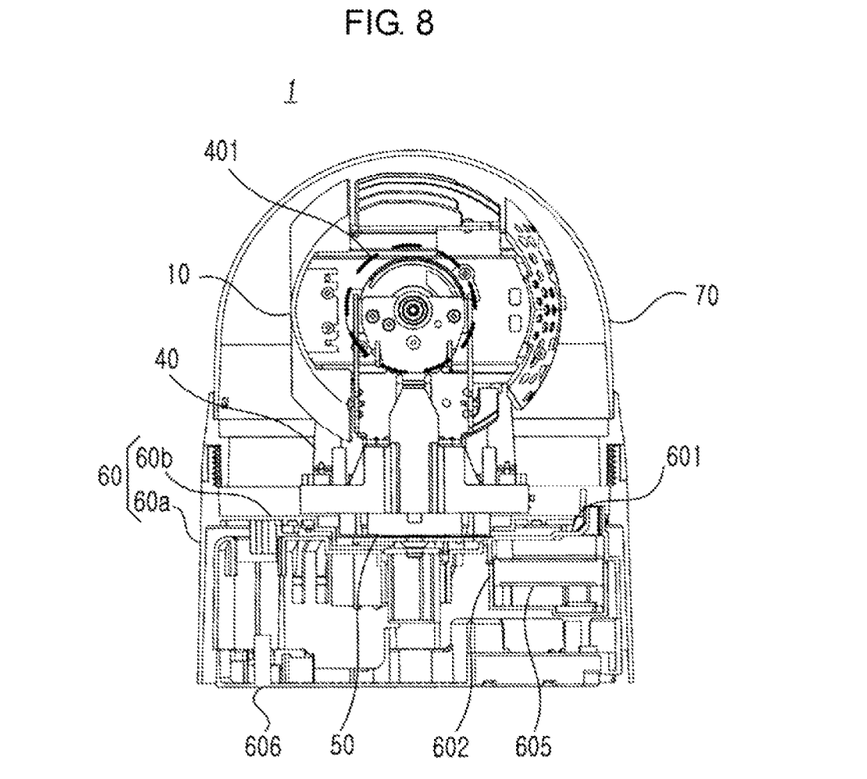
FIG. 8 is a cross-sectional view illustrating a configuration of the domed camera.

As illustrated in a configuration diagram of the domed camera 1 of FIG. 8, the case portion 60 includes a case outer circumferential portion 60a having a cylindrical shape, and a case upper surface portion 60b. In addition, a case base 606 is attached to a bottom of the case portion 60. When the domed camera 1 is attached to a ceiling, the case base 606 is attached to the ceiling and is then coupled to the case portion 60, thereby allowing the domed camera 1 to be detachably attached to the ceiling. A panning driving motor 50 is attached to the case upper surface portion 60b. A panning/tilting driving unit 40 is attached to a to surface of the panning driving motor 50, and is rotatably driver) in a panning direction by the panning driving motor 50. The panning/tilting driving unit 40 includes a tilting driving motor 401. The tilting driving motor 401 holds the rear bracket 203, and the panning/tilting driving unit 40 holds the tilting rotation axis 202, and thus the camera module 10 is held by the panning/tilting driving unit 40. Since the tilting driving motor 401 is located at a position which is on the reverse side of the camera module 10 in FIG. 8, the tilting driving motor is shown as a dashed line in FIG. 8.

The panning driving motor 50 rotates the panning/tilting driving unit 40, and thus the camera module 10 rotates in a panning direction, thereby allowing an imaging direction to be changed to the panning direction. In addition, the tilting driving motor 401 rotates the camera module 10, and thus the imaging direction may be changed to the tilting direction.

Figure 9A:
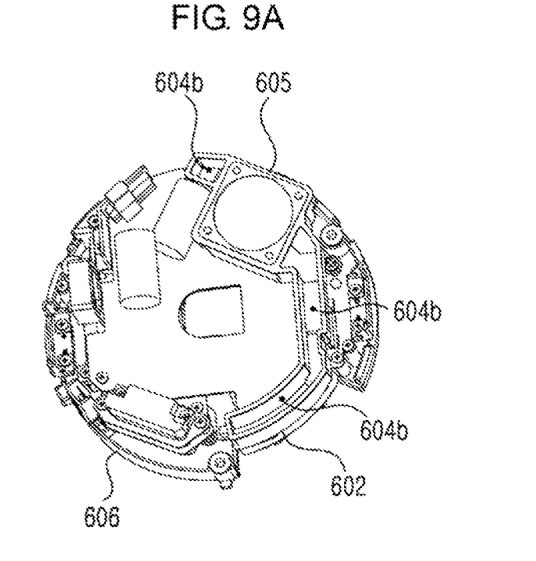
FIGS. 9A and 9B are perspective views illustrating configurations of a duct cover and a fan bracket of the domed camera.

Meanwhile, a fan bracket 602 and a duct cover 601 are attached to the case base 606 at the bottom of the case portion 60. FIG. 9A illustrates a state where the fan bracket 602 is attached to the case base 606. A fan 605 for circulating air within the domed camera 1 is attached to the fan bracket 602.

Figure 9B:
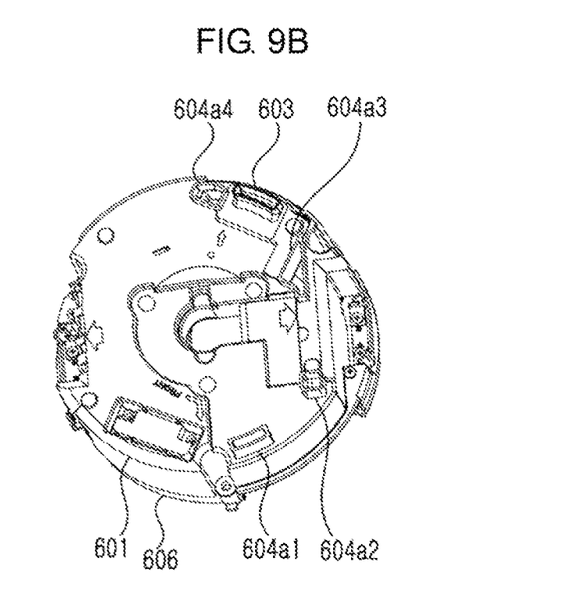

FIG. 9B illustrates a state where the duct cover 601 is additionally attached to the top of the case base 606 to which the fan bracket 602, illustrated in FIG. 9A, is attached. As illustrated in FIG. 9B, the duct cover 601 is provided with an air-blowing duct 603 for discharging air, which is sent by the fan 605, to the inside of the domed cover 70 by passing through the case upper portion 60b, and an upper inhalation duct 604a (604a1, 604a2, 604a3, and 604a4) that inhales the air from the inside of the domed cover 70.

The air-blowing duct 603 and the upper inhalation duct 604a are formed along an inner circumference of the domed cover 70. In addition, at least one of the air-blowing duct 603 and the upper inhalation duct 604a is constituted by a plurality of ducts along the inner circumference of the domed cover 70. In the present embodiment, the upper inhalation duct 604a is constituted by a plurality of (four) ducts along the inner circumference of the domed cover 70.

When the duct cover 601 is superposed on the fan bracket 602, the air-blowing duct 603 is formed immediately on the fan 605. In addition, in the fan bracket 602, an inhalation groove 604b is formed to correspond to the upper inhalation duct 604a, and the inhalation duct 604 is formed by the upper inhalation duct 604a and the inhalation groove 604b. In this manner, the case base 606 to which the duct cover 601 and the fan bracket 602 are attached is attached to the bottom of the case portion 60.

In addition, although not shown in the drawing, the case portion 60 is provided with a slip ring for exchanging a signal with the camera module 10, a circuit board for controlling the camera module 10 or supplying power, and so on.

<Heat Radiation of Domed Camera 10>

Figure 10:
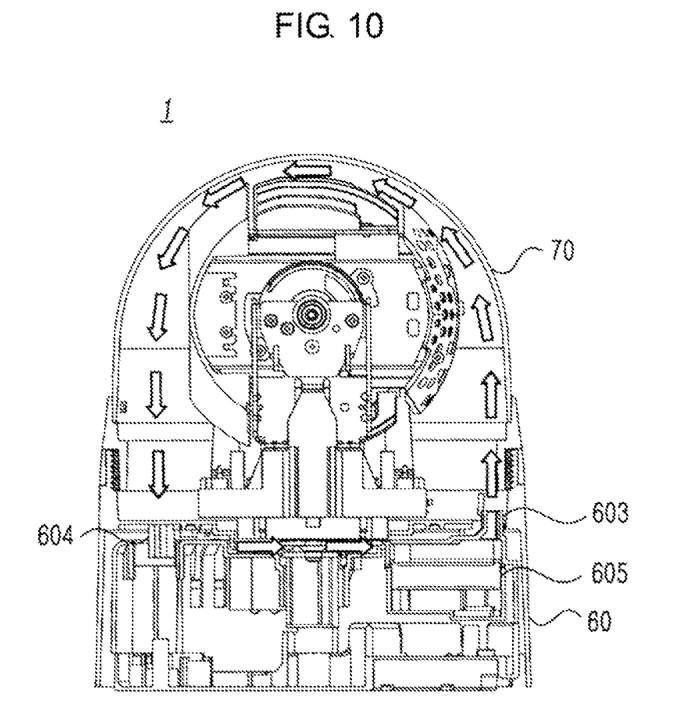
FIG. 10 is a cross-sectional view illustrating a flow of air within the domed camera.

Arrows illustrated in FIG. 10 indicate a flow of air. As illustrated in FIG. 10, air that is discharged to the inside of the domed cover 70 from the air-blowing duct 603 is transferred upwards in FIG. 10 along an inner wall of the domed cover 70, and reaches a head portion of the domed cover 70. Then the air is transferred downwards in FIG. 10 along the inner wall of the domed cover 70 and is inhaled into the inhalation duct 604. As illustrated in FIGS. 9A and 9B, since the plurality of upper inhalation ducts 604a are formed along the inner circumference of the domed cover 70, the air discharged into the domed cover 70 from the air-blowing duct 603 further spreads in a circumferential direction along the inner circumference of the domed cover 70 and is then inhaled into the inhalation duct 604. Thus, the air is widely circulated within the domed cover 70.

The air inhaled into the inhalation duct 604 passes between the duct cover 601 and the fan bracket 602 and is then transferred to the fan 605 again.

Therefore, the air is circulated between the inside of the domed cover 70 and a space surrounded by the duct cover 601 and the fan bracket 602 by the fan 605, and thus the air is never mixed with external air. For this reason, since external dust is not introduced into domed camera 1, imaging is not obstructed. In addition, when the domed camera 1 is attached to the ceiling or the like, the head portion (a spherical tip) of the domed cover 70 is located at the lowest position, and thus the temperature of the domed camera decreases. However, since air in the head portion may be circulated, heat radiation may be effectively performed.

Since the air circulating within the domed cover 70 flows along an inner surface of the domed cover 70, the air comes into contact with the upper heat sink 301, the lower heat sink 302, and the rear heat sink 303 which have an approximately spherical shape. Thus, the heat sinks are cooled. The heat of the DSP 102 is radiated from the upper heat sink 301. The heat of the CMOS image sensor 104 is radiated from both the rear heat sink 303 and the lower heat sink 302. In this manner, since the heat of the CMOS image sensor 104 is radiated from two heat sinks, the heat of the CMOS image sensor 104 is radiated from the heat sink having a wider surface area than the DSP 102, therefore heat radiation of the CMOS image sensor 104 may be sufficiently performed. In addition, the heat sink used for the heat radiation of the CMOS image sensor 104 and the heat sink used for the heat radiation of the DSP 102 are configured as different members, and mutual heat transfer is suppressed. Thus, even if the temperature of the upper heat sink 301 increases due to heat radiation of the DSP 102, the heat radiation of the CMOS image sensor 104 is not obstructed.

When the heat sink is located in the vicinity of the case upper portion 60b, there is a concern that the flow rate of the air coming into contact with the heat sink may be decreased. However, in the present embodiment, the heat radiation of the CMOS image sensor 104 is performed at two positions, that is, the rear side and the lower side of the camera module 10. For this reason, when rotation is performed in a tilting direction, even though one heat sink is located in the vicinity of the case upper portion 60b where air does not flow smoothly, the other heat sink is located at a position where air flows smoothly. In this manner, the heat radiation of the CMOS image sensor 104 may be sufficiently performed without regard to an angle of tilting. With such a configuration, the temperature of the CMOS image sensor 104 may be decreased further than the DSP 102.

In addition, each heat sink is configured to have an approximately spherical shape about a rotation center of panning and tilting of the camera module 10. For this reason, even though the imaging direction of the camera module 10 is changed by performing panning and tilting, a state of heat radiation does not change significantly, thereby allowing heat radiation to be stably performed.

<Rotation Adjustment>

As described above, the front bracket 201 and the rear bracket 203 are attached to the rear plate 110 from the rear of the camera module 10 by using two screws 204. For this reason, the camera module 10 may be rotated with respect to the front bracket 201 and the rear bracket 203 about the optical axis 111 of the camera module 10 by loosening the two screws 204.

The camera module 10 may be inclined in a direction in which the camera module 10 rotates about the optical axis in accordance with component accuracy and assembling accuracy. As a result, a captured image may be inclined. The domed camera 1 of the present embodiment rotates the camera module 10 by loosening the screws 204 for fixing the rear bracket 203, thereby allowing a gradient of the captured image to be corrected. In addition, since the screws may be operated from the rear of the camera module 10, which is at the side opposite to the lens 101, and the adjustment may be performed while not obstructing the imaging and viewing the captured image.

In addition, in the present embodiment, although an example has been described in which a plurality of heating units having different maximum allowable temperatures are cooled, heating units having different features may be used. For example, the present invention may be applied to a case of including a plurality of heating units having significantly different amounts of heat generation or a case where an amount of heat generation of one of plurality of heating units significantly varies.

According to an imaging device of the present invention, heat radiation can be appropriately performed according to features of a heating unit of the imaging device.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An imaging device comprising:
a camera module which performs imaging;
wherein the camera module comprises a CMOS image sensor and a digital signal processor (DSP);
a tilting driving motor which drives the camera module in a tilting direction;
a panning driving motor which drives the camera module in a panning direction;
wherein the CMOS image sensor is a first heat source;
the DSP is a second heat source;
wherein the imaging device further comprises:
a front bracket and a rear bracket which are attached to the camera module;
the front bracket is configured to be rotatable about an optical axis and includes a tilting rotation axis;
the tilting rotation axis is an axis for rotating the camera module in the tilting direction; and
wherein the tilting driving motor is attached to a portion which is on a reverse side of the rear bracket;
a first heat sink which is formed on one surface of the camera module in a direction that is perpendicular to an imaging direction and a rotation axis of the tilting driving motor;
a second heat sink which is formed on another surface of the camera module in a direction that is perpendicular to the imaging direction and the rotation axis of the tilting driving motor;
a third heat sink which is formed on a rear surface of the camera module when the imaging direction is set as a front direction;
a plate which transfers heat of the first heat source to the first heat sink, the third heat sink and the rear bracket;
an inner cover which transfers heat of the second heat source to the second heat sink;
an insulation sheet which suppresses heat transfer between the first and the second heat sinks and between the third and the second heat sinks wherein the insulation sheet is formed of a resin material;
a domed outer cover which covers the camera module, wherein the domed outer cover is transparent;
an air-blower which performs air-blowing along an inner circumference of the domed outer cover;
a discharging duct which discharges air that is blown by the air-blower along the inner circumference of the domed outer cover; and
an inhalation duct which inhales the air that is discharged from the discharging duct along the inner circumference of the domed outer cover, and
the air-blower, the discharging duct, and the inhalation duct are configured in such a manner that the air blown by the air-blower circulates within the imaging device.

2. The imaging device of claim 1, wherein the second heat source has a higher maximum allowable temperature than the first heat source.

* * * * *